United States Patent [19]

Borror et al.

[11] 4,170,130
[45] Oct. 9, 1979

[54] HOLLOW CONTAINER FAULT DETECTOR

[75] Inventors: Phillip E. Borror; Jerome A. Kwiatkowski, both of Muncie, Ind.

[73] Assignee: Ball Corporation, Muncie, Ind.

[21] Appl. No.: 594,553

[22] Filed: Jul. 9, 1975

[51] Int. Cl.$^2$ ............................................. G01M 3/28
[52] U.S. Cl. ..................................... 73/49.1; 73/45.2; 73/49.5
[58] Field of Search ................... 73/37, 40, 40.7, 49.1, 73/49.5, 49.6, 49.8, 41; 138/90; 209/74 R

[56] References Cited

U.S. PATENT DOCUMENTS

| | | | |
|---|---|---|---|
| 2,578,728 | 12/1951 | Musser | 73/37 |
| 2,667,136 | 1/1954 | Reichl et al. | 73/49.5 UX |
| 2,828,620 | 4/1958 | Franks | 73/49.6 |
| 3,199,598 | 8/1965 | Loomis | 73/49.1 X |
| 3,383,906 | 5/1968 | Gillet | 73/49.1 X |
| 3,431,773 | 3/1969 | Calhoun | 73/49.2 |
| 3,805,945 | 4/1974 | Maeda et al. | 209/74 R X |
| 3,871,209 | 3/1975 | Hasha | 73/49.1 |
| 3,877,293 | 4/1975 | McKeage | 73/49.1 |

FOREIGN PATENT DOCUMENTS 2102548 7/1972 France .................................... 73/40.7

Primary Examiner—Gerald Goldberg
Assistant Examiner—Joseph W. Roskos
Attorney, Agent, or Firm—Cushman, Darby & Cushman

[57] ABSTRACT

A leakage analyzer method and apparatus for detecting faults in hollow structures such as polypropylene tubing and the like. The apparatus includes a hollow elongated test chamber through which the tubing is passed. At the outlet end of the chamber, a rear stop member prevents the tubing from passing completely through the test chamber as it is being fed thereto. When the trailing edge of the tubing passes a predetermined point, a rear stop member positions the structure in said chamber so that clamping means positioned at both the front and rear of the test chamber can be energized to clamp about the tubing and at the same time seal the respective ends of the test chamber. Plug members are positioned in the respective ends of the tubing and are expanded to seal the ends of the structure. A fluid such as air is introduced into the chamber and about the outside periphery of the tubing until the pressure in the chamber reaches a predetermined level. A means is positioned in one of the plug members for detecting the pressure within the tubing and if the pressure rises above a predetermined limit after a preselected period of time, a fail signal is generated which causes the tubing to be transported to a predetermined location after the plugs and clamping means have been removed from the tubing and test chamber. Holes as small as 0.005 inch and even smaller can be accurately detected. Timing circuits are provided to control the cycle repetition while pass/fail circuits control subsequent routing of each tube with automatic counters monitoring the total number of tubes tested, total number of failed tubes, and total number of successful tubes.

14 Claims, 17 Drawing Figures

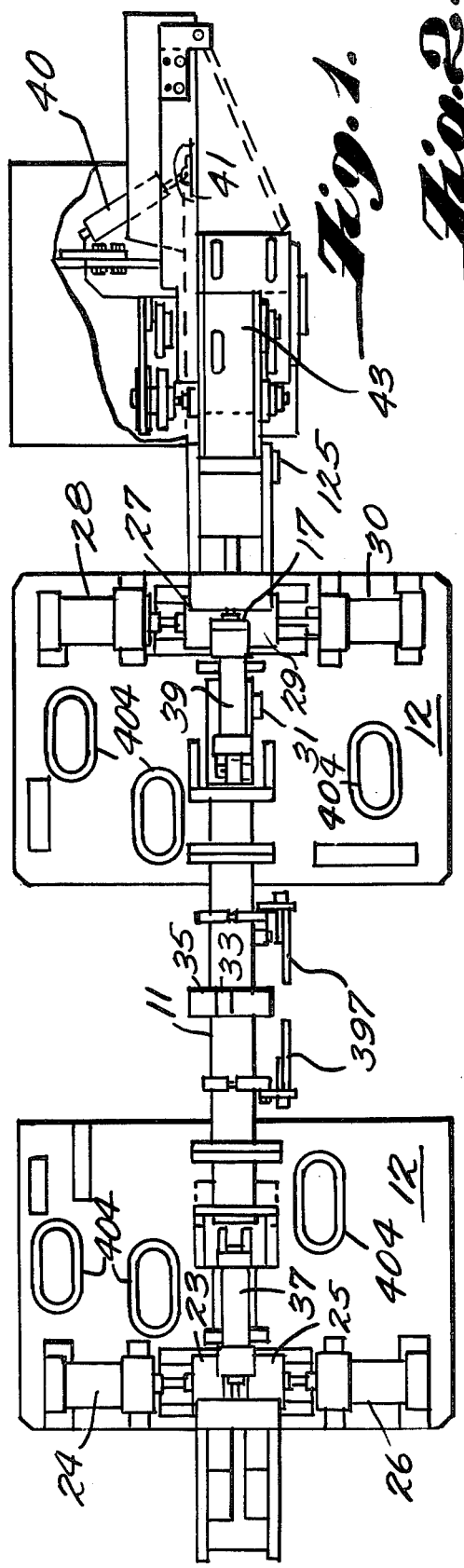
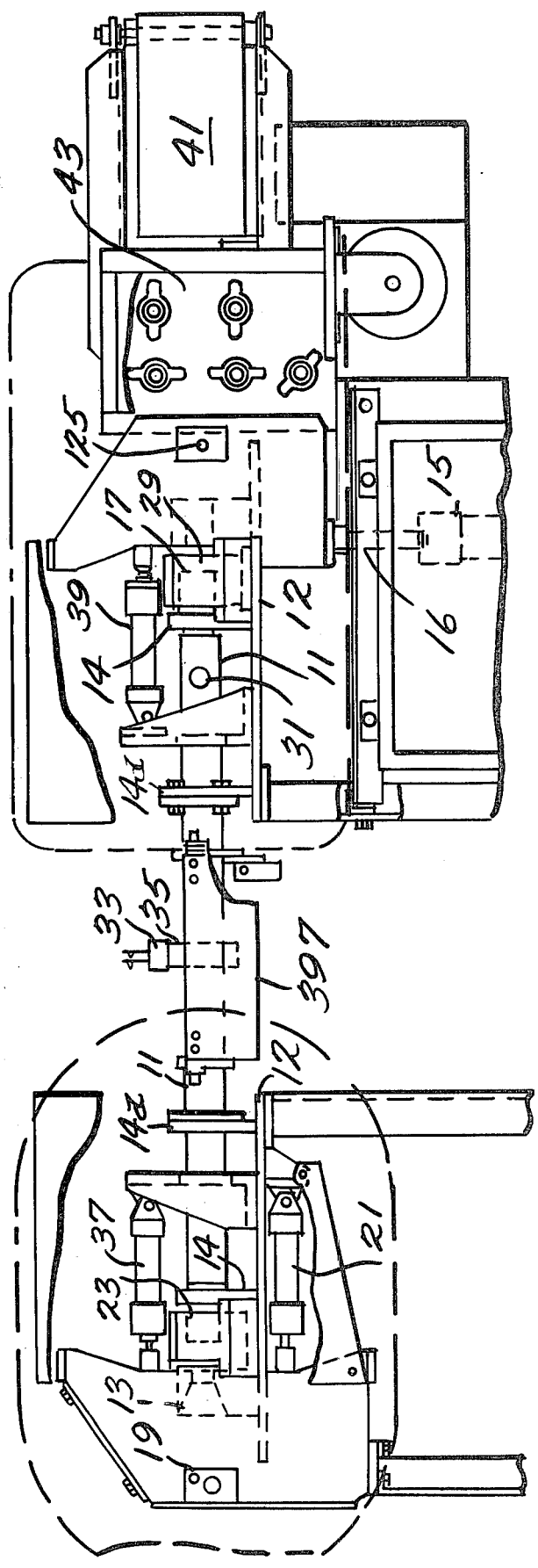
Fig. 1.
Fig. 2.

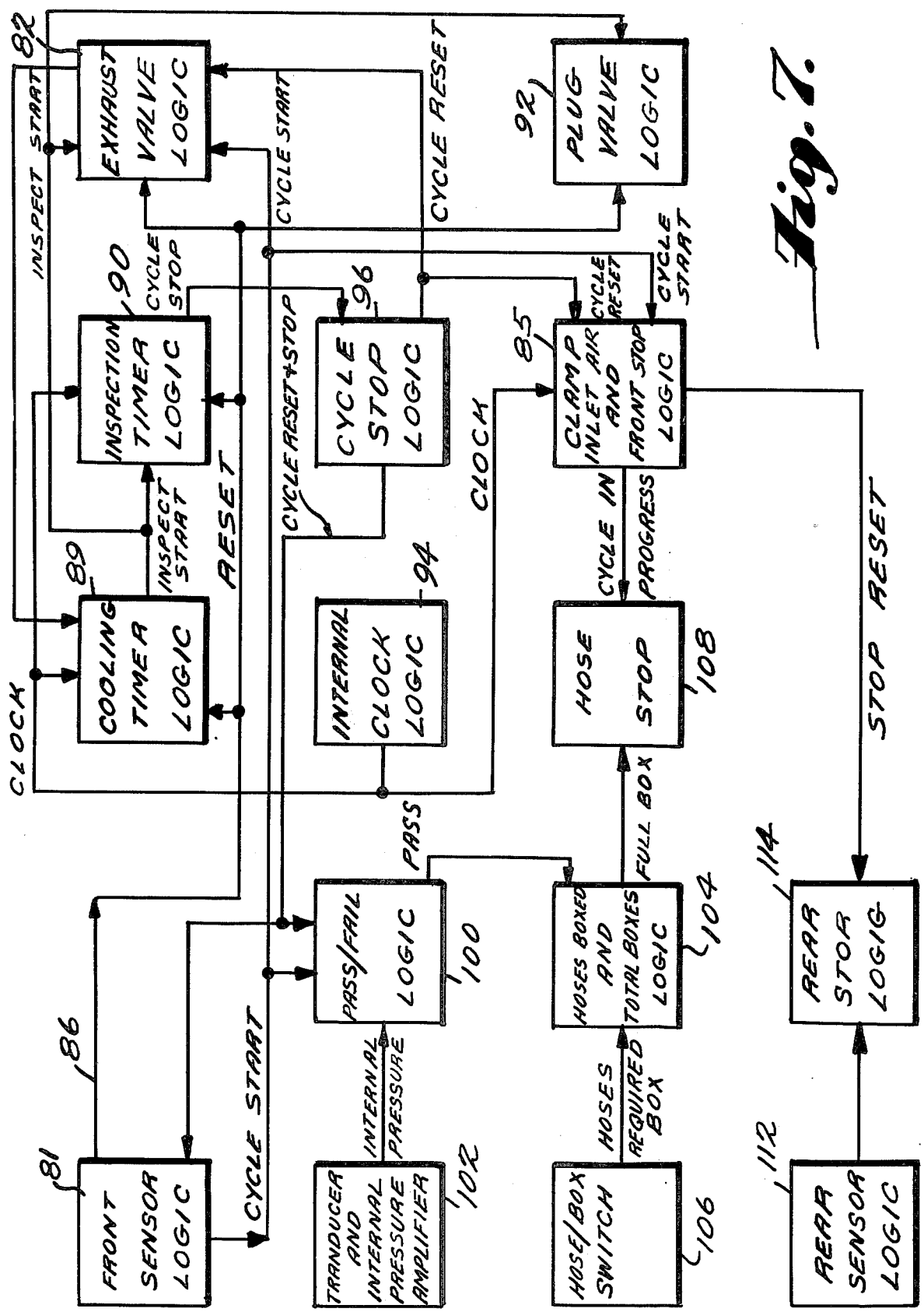

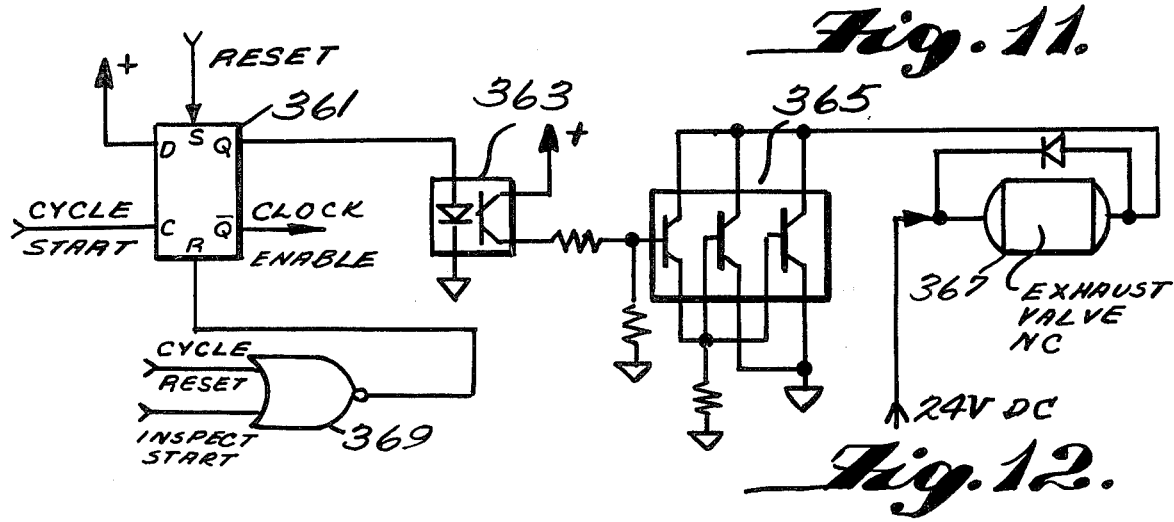
Fig. 11.
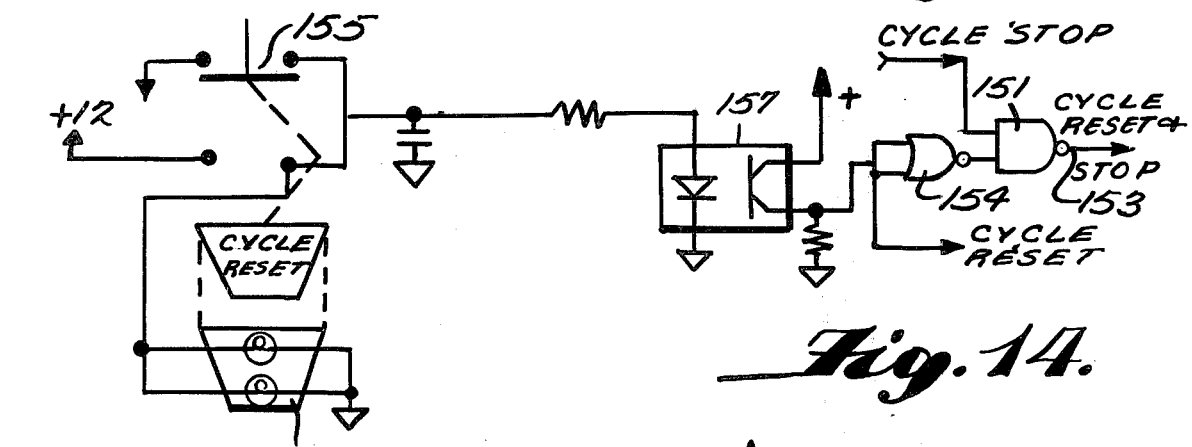
Fig. 12.
Fig. 14.
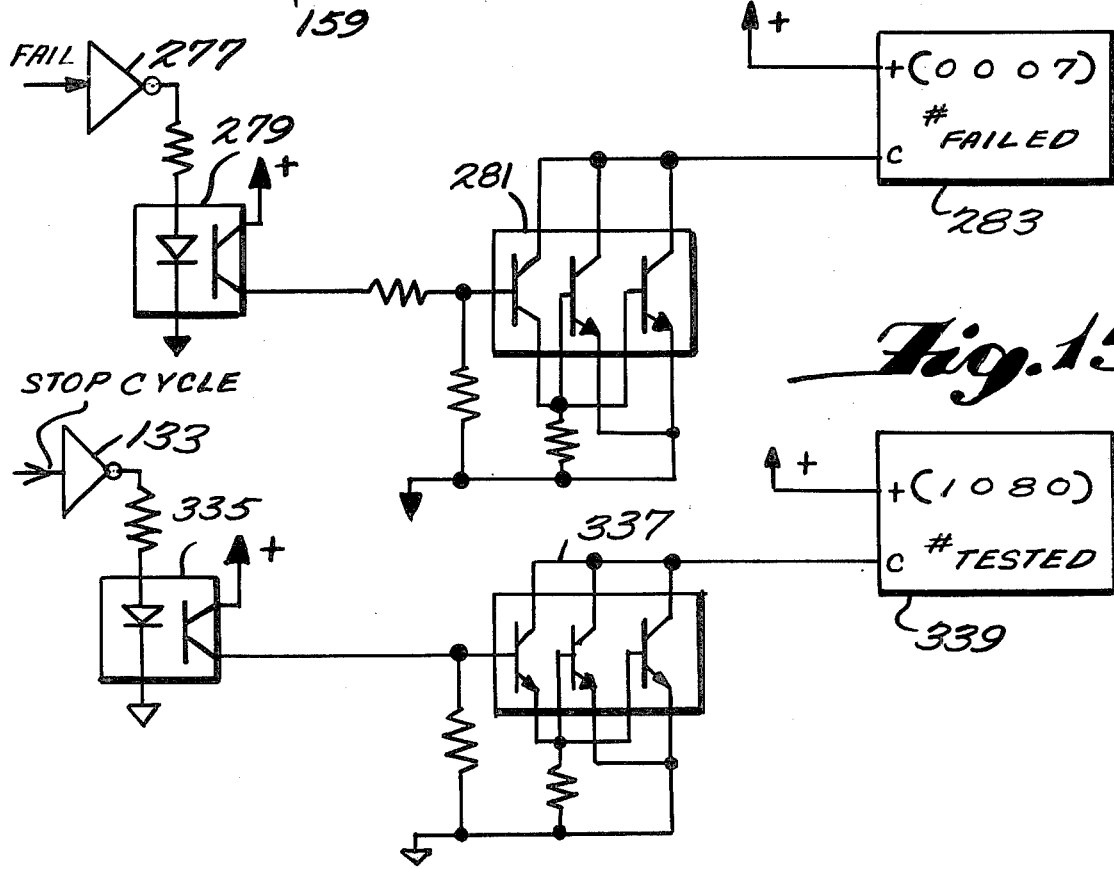
Fig. 15.

HOLLOW CONTAINER FAULT DETECTOR

BACKGROUND OF THE INVENTION

This invention relates to an improved method and apparatus for analyzing leaks caused by faults in hollow structures.

In the past, hoses and the like such as those made from polypropylene were tested by submerging a pressurized hose into a tank of water and then visually inspecting for air bubbles. This method was found to be undesirable because of the time involved, and the lack of accurate and objective testing resulting therefrom. Thus, in many instances, the hoses were installed in mechanisms such as for example, washing machines, wherein a fault in a hose would not normally be detected until a final quality control inspection. Thus, the replacement of faulty hoses involved excessive disassembly time of the washing machine and increased production costs to the customers. In view of this, there has arisen a requirement that each and every hose manufactured be tested before the hose is installed in a piece of equipment. In the aforementioned manual testing method, approximately seven inches at each end of the hose extended out of the water during the test resulting in 15 to 20% of each hose not being inspected. Further, air bubbles adhering to the outer wall of the hose and the turbulence of the water made visual inspection of leakages very difficult. In addition, very small holes such as holes less than 0.008 inch were very difficult to detect because of the speed with which the test had to be conducted if the manufacture of the hoses on an assembly line basis was to be at all economically feasible.

Another drawback to manual water testing was that such testing necessitated multiple handling operations and additional personnel to achieve the necessary production requirements. Thus, for example, the production and testing of hoses entailed the assembly of a hose section and often times the assembly and welding or bonding of two hose sections together to make a hose of sufficient length, placing the completed hose into a relatively large container, leakage testing the hose, replacing any faulty hose and then packaging the good hoses. A secondary problem resulted in the fact that cardboard shipping containers are generally desired because of economic factors relating thereto. However, since the hoses were water tested, water remaining in the hoses after testing had a tendency to damage the cardboard shipping containers. In addition, health and safety standards have presented a problem because of water spillage around the leakage test work area.

In view of the aforementioned problems with manual testing of hoses on a mass production basis, efforts have been made to develop a testing apparatus for testing hoses on a mass production basis. In one such development effort, each end of the hose was plugged and compressed air was then introduced through one of the plugs in the hose. The pressure was increased to a preset level at which point the introduction of compressed air into the hose was terminated. Then after a predetermined period of time the pressure within the hose was sampled. This testing method created a problem in that the hose, particularly when thin hoses were tested, resulted in a ballooning or expanding of the pressurized hose resulting in a significant volume variation within the hose and a corresponding internal pressure change. Thus, it was found that pressurizing the internal volume of a hose and then detecting the pressure drop therein resulted in test results which varied widely, particularly in the case of thin hoses which had a tendency to expand or balloon under the pressurized air which expansion resulted in a lack of precision in measuring the integrity of the hoses.

It accordingly is an object of this invention to provide a method and apparatus for accurately detecting faults in hollow structures.

It is another object of this invention to provide an automatic means for detecting faults in hollow structures accurately and efficiently.

SHORT STATEMENT OF THE INVENTION

Accordingly, this invention relates to a leakage analyzer method and apparatus for detecting faults in hollow structures such as polypropylene tubing and the like, wherein the apparatus includes an elongated test chamber having normally open ends through which the tubing or hose passes. A means is provided for positioning the tubing within the chamber and for clamping the tubing in position at each end of the test chamber wherein the clamping means seals off the area at the respective ends of the test chamber between the test chamber and the outside of the tubing. Plug means are positioned in the respective ends of the tubing and are expanded against the tubing to thereby seal the inside of the tubing. A fluid such as air under pressure is introduced into the test chamber about the outside of the tubing until the pressure in the test chamber reaches a predetermined limit. After a predetermined period of time, the pressure within the tubing is detected and compared against a preset standard. If the pressure rises below a preset limit, the tubing is transported to a first location after the respective plugs and clamping means have been released from the tubing. If the pressure does rise above the predetermined limit, the tubing is transported to a second location upon release of the respective plugs and clamps.

BRIEF DESCRIPTION OF THE DRAWINGS

Other objects features and advantages of the present invention will become more fully apparent from the following detailed description of the preferred embodiment, appended claims, and the accompanying drawings in which:

FIG. 1 is a plan view of the leakage analyzer of the present invention,

FIG. 2 is a side elevation view shown in partial cutaway of the leakage analyzer of the present invention, FIG. 7 is a schematic block diagram of the control circuitry of the leakage analyzer of the present invention, FIG. 11 is a schematic illustration of the exhaust valve logic, FIG. 12 is a schematic block diagram of the cycle stop logic, FIG. 14 is a schematic diagram of the hoses failed logic, FIG. 15 is a schematic diagram of the number of hoses tested logic.

DETAILED DESCRIPTION OF THE PREFERRED EMBODIMENT

Figure 3:
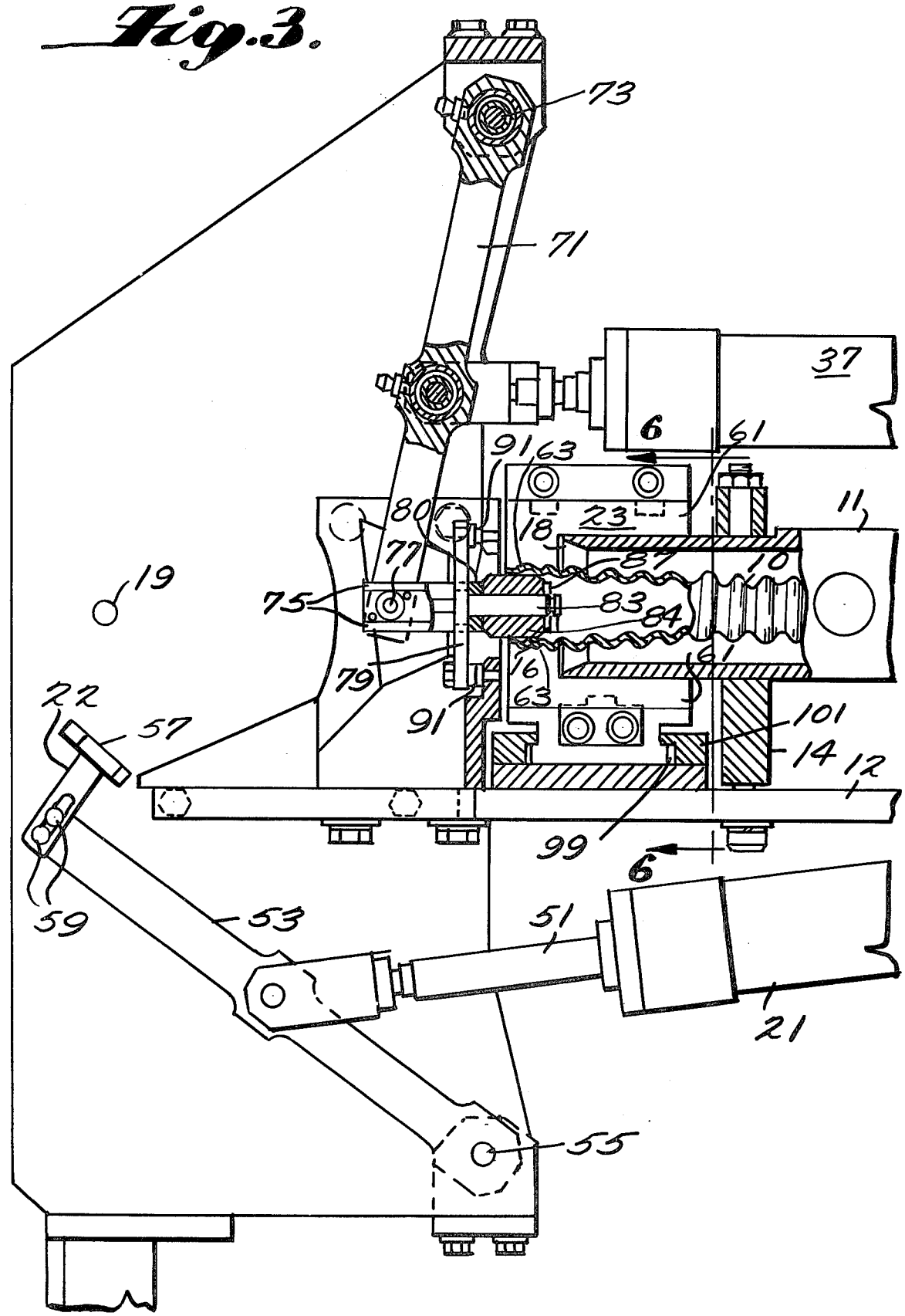
FIG. 3 is an enlarged elevation view shown in partial section of the front of the leakage analyzer of the present invention.

Refer now to the drawings wherein like numerals designate like elements throughout the following detailed description of the preferred embodiment.

The present invention is related to a leakage analyzer wherein an externally applied pressure about a hollow structure, such as for example, a polypropylene hose having a generally corrugated structure is compared against the ambient internal pressure of the hose to determine whether the hose has adequate structural integrity to be utilized in articles of manufacture such as washing machines, etc. As is known in the art these hoses are made of predetermined lengths and accordingly it is often necessary to pass each hose through an electro-magnetic bond welder to weld two or more sections of the hose together to provide a hose of sufficient length. However, it should be understood that any type of hose, tubing or hollow structure or container can be tested in accordance with the method and/or apparatus of the present invention. Further, the hoses need not be previously welded or heat treated in keeping with the invention. However, in the specific case where two or more hoses have been bonded or otherwise heat treated immediately prior to testing, the hose thus formed is passed, as illustrated in FIGS. 1 and 2 into a test chamber 11 of the leakage analyzer of the present invention via a front entry cone 13. The entry cone has flared edges in order to collect and direct the leading edge of the hose into the testing chamber 11 which in the preferred embodiment is an aluminum cylinder. The hose may be coupled to the testing chamber by any suitable means known in the art such as for example, by means of a V-belt drive mechanism. Initially a rear stop cylinder 15 is energized to drive a rear stop member 16 into the area through which the hose passes proximate the rear aperture 17 of the test cylinder 11. After the trailing edge of the hose moves past a front photocell arrangement 19, a front stop cylinder 21 is pressurized to cause a front stop member 22 (see FIG. 3) to engage the trailing edge of the hose and move the hose inwardly to a preselected position with respect to the test chamber 11. Immediately after the hose is positioned, front clamps 23 and 25 and rear clamps 27 and 29 clamp about the front and rear ends of the test cylinder, respectively, by means of front cylinders 24 and 26 and rear cylinders 28 and 30, respectively.

When the hose has been clamped in position, front and rear stops 22 and 16 respectively, are retracted downward and an exhaust valve 31 is opened. Air is then introduced into the chamber 11, through an air inlet valve 33 and an air inlet manifold 35 and is exhausted through the exhaust valve 31. The air inlet manifold 35 is positioned near the center of the cylinder 11 and provides for coupling input cooling air via air inlet valve 33 to the chamber and as will be explained more fully hereinbelow permits a fluid such as air under a predetermined pressure to be introduced to the test chamber 11 when inspection of the hose takes place. The air inlet valve and air inlet manifold are positioned along the chamber 11 at the approximate location of the welded or bonded section of the hose thus permitting a rapid cooling of this heated portion of the hose. The cooling cycle wherein cooling air is passed into the chamber 11 via valve 33 can be adjusted to last from about 1.0 seconds to 9.9 seconds depending upon the time required to cool the bond to a temperature level of about 125° F. or lower.

Upon completion of the cooling cycle, the exhaust valve 31 is closed thereby forming an airtight chamber about the external periphery of the hose. At the same time a front plug cylinder 37 is pressurized to cause a front plug to be positioned in the mouth of the trailing edge of the hose. At the same time, a rear plug cylinder 39 is pressurized to cause a rear plug to be positioned within the mouth of the leading end of the hose. As will be explained more fully hereinbelow, these plugs seal both ends of the hose thereby forming a separate, sealed internal cavity within the hose. External pressure is then applied to the internal portion of the cylinder 11 via the air intake valve 33 and air intake manifold 35 until the internal pressure reaches a predetermined level which for example may be in the 20 to 35 psi range. In the meantime the internal pressure of the hose remains at or near atmospheric pressure.

The internal pressure of the hose is monitored by means of a pressure transducer via the rear plug member as will be explained hereinbelow. If the detected pressure remains nearly constant for the duration of the test cycle, the hose is determined to be air tight or "good" and passes the test. On the other hand, if the internal pressure rises, this is an indication that air must be entering through a hole in the wall of the hose. This pressure is converted to an electrical signal. If the pressure rises above a predetermined level after the test cylinder 11 is pressurized, a fail gate causes the hoses which fail the test to be directed out of the test chamber 11 via a belt drive 43 into a first location. On the other hand, if the hose passes the test the fail gate is swung to the direction illustrated in FIG. 1 so that the hoses are directed into a second location.

The various valve actuators for conveying pressurized fluid to the respective cylinders are positioned on the hose support members 12 of the leakage analyzers as indicated schematically by the indicators 404.

Refer now to FIGS. 2 and 3 which is a more detailed illustration taken in side elevation and shown in partial cut-away of the front portion of the leakage analyzer of the present invention. The cylinder 11 which is generally tubular in shape and preferably made of aluminum is secured to a support platform 12 by means of brackets 14 and 14a. The inside front end edge 18 of the cylinder 11 is flared outwardly to channel the leading edge of the hose 10 into the cylinder. The hose is shown in partial cut-away positioned within the test chamber 11 with an end portion thereof extending out of the front aperture 18 of the test chamber 11. The length of the hose extending out of the test chamber 11 is determined by means of a front stop member 22. Thus, after the trailing edge of the hose passes front photo cell 19, the front stop cylinder 21 is pressurized to draw piston rod 51 therein thereby causing stop arm 53 to rotate clockwise about a pivot 55 which pivot is secured to the frame of the leakage analyzer. The front stop 22 is secured to the arm 53 with the abutting face 57 thereof being variably spaced with respect to the arm 53 by means of adjusting screws 59. Thus, when the arm 53 is rotated to its furtherest clockwise position, the abutting face 57 of the front stop 22 pushes the hose 10 to a position such that the trailing edge of the hose extends outwardly from the front aperture 18 of the test cylinder 11 by a predetermined distance.

Figure 4:
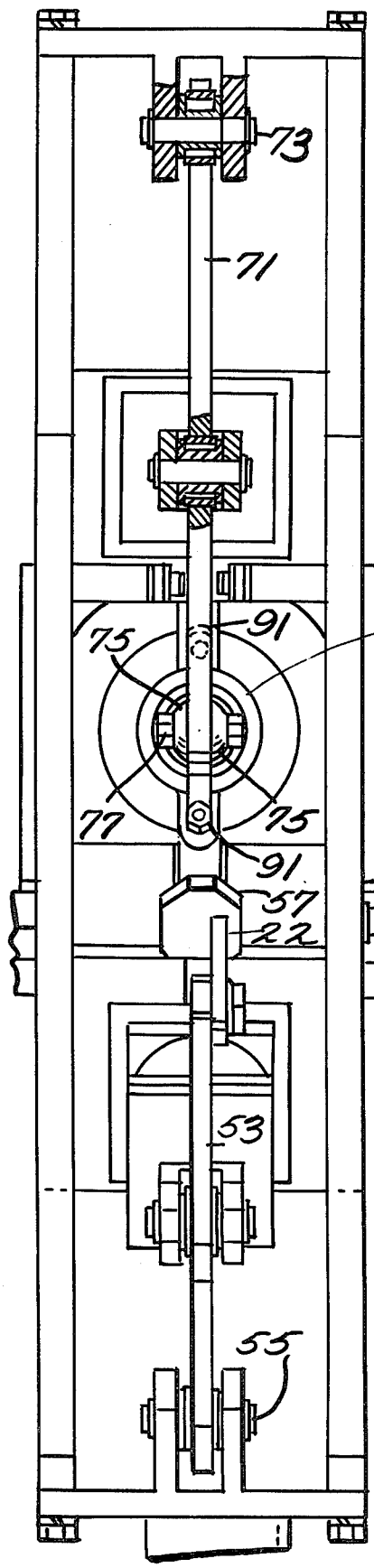
FIG. 4 is an end-view of the front portion of the leakage analyzer illustrated in FIG. 3.

Next, in sequence a clamp member 23 is moved toward the external periphery of the test cylinder 11 and in addition is moved toward the trailing portion of the hose which extends outside of the test chamber. The clamp 23, the structure of which will be explained more fully hereinbelow has a high wear resistance sealing member 61 formed of any suitable material such as a plastic material. The sealing portion 61 of the clamp 23 seals about the external periphery of the chamber 11 and at the same time clamps the trailing edge of the hose 10. It is noted that the portion of the sealing member 61 which clamps about the hose has relieved portions 63 therein which portions are designed to receive the ridges or corrugations of the trailing edge of the hose. Thus, in a hose having such relieved or corrugated sections it is highly desirable that the hose be precisely positioned so that the ridges extend into the relieved portion of the sealing member 61 so that these ridges are not damaged during the testing of the hose. It is for this reason that the front stop member 22 is provided having an abutting surface 57 for precisely positioning the hose with respect to the cylinder 11 and the relieved portion 63 of the sealing member 61. After clamp 23 has been moved into a clamping position, it being understood that its companion clamp 25 is simultaneously closed about the other half of the test chamber 11 and trailing edge of the hose. When this operation is completed, the front stop cylinder operates to rotate arm 53 and hence front stop member 52 counterclockwise. The plug cylinder 37 is pressurized to rotate arm 71 about an axis 73 which is fixedly but rotationally secured to the frame of the leakage analyzer of the present invention. Arm 71 has a pair of plug drive members 75 rotatably secured thereto about the axis 77. These drive arms can be more easily seen in FIG. 4. The arms 75 extend through a stop plate 79 and engage a stiff abutting material 80 which extends about the outside periphery of a rod 83. The rod 83 is fixedly secured to or formed integral with the stop plate 79. An expandable plug 84, preferably formed of a wear resistant material such as rubber which is impervious to gases such as air, is positioned over the rod 83 and maintained in position at one end by washer and retaining ring 87 and the other end by the abutting member 80.

In operation, when the cylinder 37 rotates arm 71 counterclockwise into the position shown, stop plate 79 abuts against stops 91 thereby preventing further counterclockwise movement of the stop member 79, rod 83 and washer 87. The drive arms 75, however, continue to move in the counterclockwise direction through the stop member 79 and against the abutting member 80 thus causing the expandable sealing plug 84 to be compressed in the longitudinal direction. This compressing of the plug 84 causes it to expand radially outwardly against the trailing edge of the hose 10 which in turn is pressed against the sealing members 61 of the clamps 23 and 25 to thereby seal the trailing edge of the hose 10.

When the plug is to be removed from the trailing edge of the hose, the arm 71 is rotated clockwise by the plug cylinder 37 thereby releasing the pressure on the expandable plug member 84 until the plug member 84 disengages from the hose 10 in a generally radial direction. As arm 71 continues to rotate in a clockwise direction, the stop plate 79 and the expandable plug material 84 are withdrawn from the hose 10 and away from the front end of the test chamber 11 so that another hose can be introduced thereinto.

Figure 6:
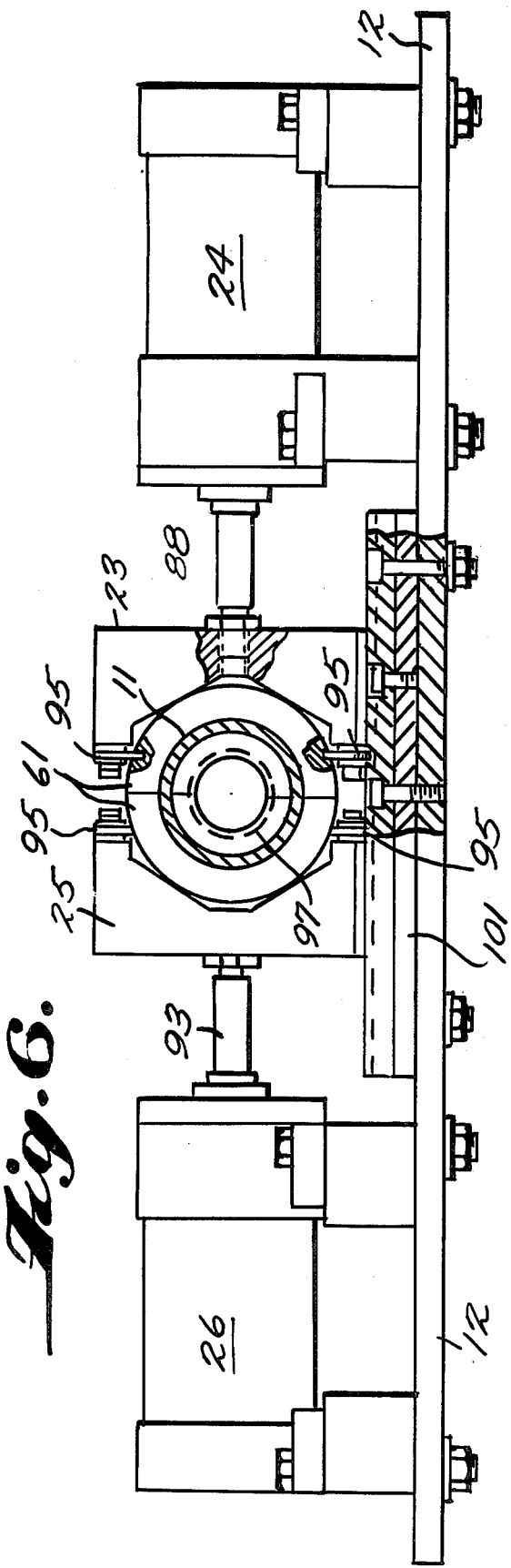
FIG. 6 is an end view of the clamping mechanism of the present invention taken along the lines 6—6 of FIG. 3 and is shown in partial cut-away.

Refer now to FIG. 6 which is an end elevation view of the clamping mechanism of the present invention taken along the lines 6—6 of FIG. 3. A clamping cylinder 24 has a piston rod 88 fixedly secured to a clamping member 23. The cylinder 24 is fixedly secured to the platform 12 of the leakage analyzer of the present invention. On the opposite side of the cylinder 11 is a second clamping cylinder 26 which is fixedly secured to the platform 12. A piston rod 93 extending from the clamping cylinder 26 is fixedly attached to a second clamping member 25. Sealing members 61, preferably formed of a high wear resistance material, are each in the form of a semi-cylinder and are floatingly positioned within clamping members 23 and 25. The sealing members 61 are each permitted freedom of movement so that they can form a tight grip about the cylinder 11 and conform themselves to the shape of the trailing edge of the hose to be gripped. The sealing members 61 are accordingly loosely secured to the respective clamping members 23 and 25 by means of key members designated by the numeral 95. The dotted line 97 designates the grooves 63 in the sealing members 61 which as aforementioned are for the purpose of receiving ridges or corrugations in the trailing edge of the hose to be tested.

The clamping members 23 and 25 slide in a slot 99 (see FIG. 3) formed by tracks 101. Thus, in operation when the hose to be tested is in place, cylinders 24 and 26 are simultaneously energized to force clamping members 23 and 25 to move inwardly toward the cylinder 11. The sealing members 61 press against the outside periphery of the testing chamber 11 and against the trailing edge of the hose 10 to thereby maintain the hose in position as the plug member 85 is positioned in the trailing aperture of the hose. At the opposite end of the testing chamber proximate the rear edge of the test chamber 11, a second set of substantially identical clamping cylinders 28 and 30 and a second set of substantially identical clamping members 27 and 29 with sealing members 61 movably secured thereto clamp about the leading edge of the hose after the hose has been positioned in the test chamber.

Figure 5:
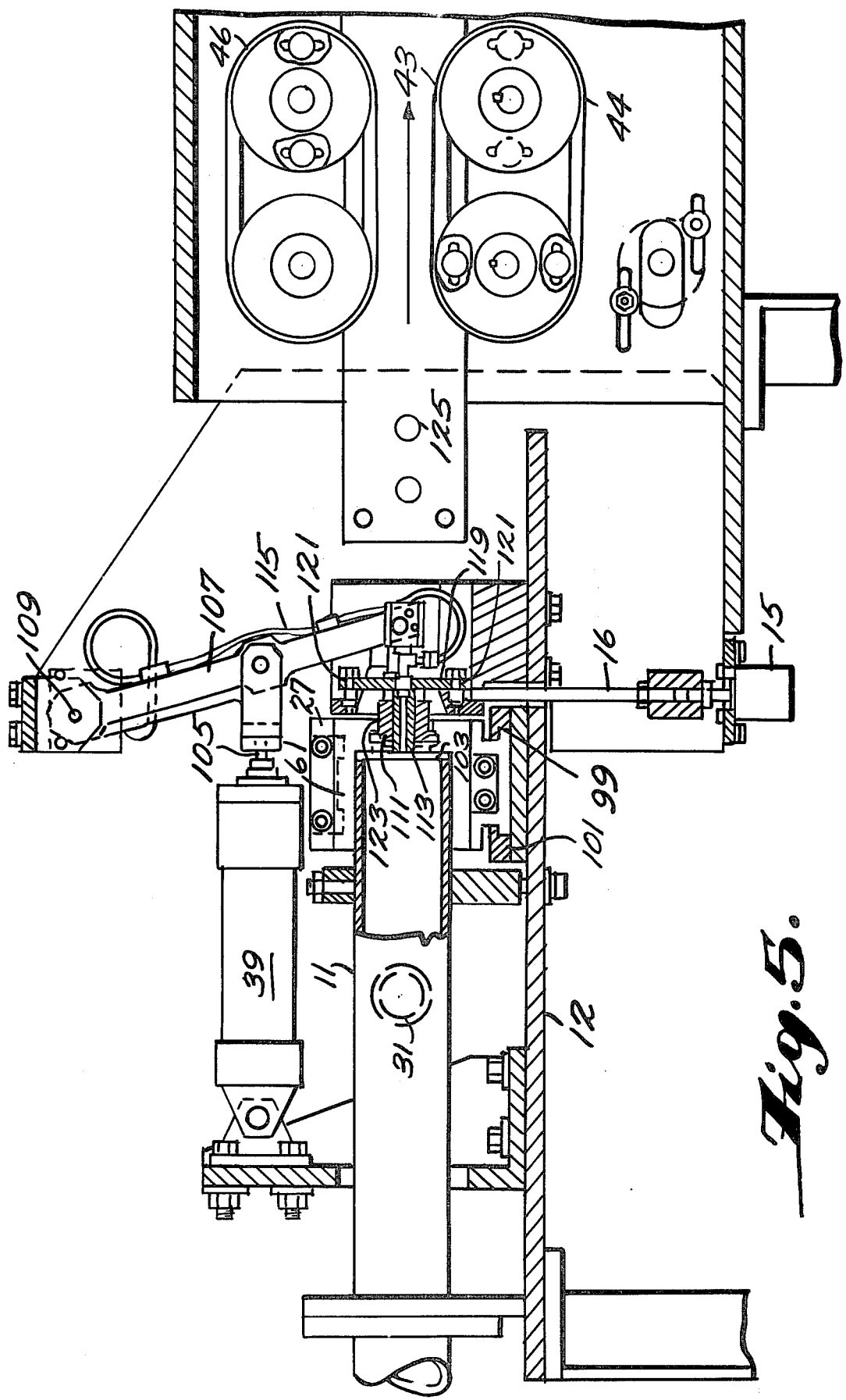
FIG. 5 is an enlarged side elevation view shown in partial cut-away portion of the leakage analyzer of the present invention.

Refer now to FIG. 5 which is a partial view of the rear portion of the leakage analyzer of the present invention shown in partial cut-away. The test chamber 11 is shown having an exhaust valve outlet 31 with the test chamber 11 being fixedly secured to a support plate 12 which may or may not be formed integral with the support plate at the front of the leakage analyzer. A rear stop cylinder 15 has a stop rod 16 secured thereto which rod extends upwardly when the hose 10 is first introduced into the test chamber 11 to block the hose from passing through the test chamber and into an output drive mechanism generally designated by the numeral 43. After the hose has been stopped and appropriately positioned by the front stop member 22, the clamping cylinders 28 and 30 are actuated to cause the clamping members 27 and 29 to move towards one another to thereby cause the sealing members 61, loosely secured thereto, to grip about the outside rear end portion of the test chamber 11 and to grip the leading edge of the hose 10 which edge extends outwardly and away from the aperture 103 of the test chamber 11. As is the case with the front clamping mechanism, the rear clamp sealing members 61 each have relieved portions therein for receiving the ribbed or corrugated portions of the hose which extend outwardly and away from the aperture 103 of the chamber 11. Next, in sequence, cylinder 15 is actuated to retract the rod 16 away from the rear aperture of the cylinder 11 and cylinder 37 is activated to retract the front stop member 22 away from the front aperture of the cylinder 11. A rear plug cylinder 39 has a piston rod 105 secured to an arm 107 of the rear plug mechanism. The arm 107 pivots about axis 109 which is fixedly secured to the frame of the leakage analyzer. At the opposite end of arm 107 is secured a plug and stop plate arrangement similar to that described in connection with the front plugging apparatus of the leakage analyzer. However, the plug member 111 at the rear of the leakage analyzer has a hole bored through the center of the rod 113 for communicating the pressure in the inside of the hose being tested with an internal pressure hose 115 as illustrated. Hose 115 communicates the pressure of the inside of the hose being tested with a pressure transducer of conventional design.

In operation when the rear plug cylinder is actuated, arm 107 is rotated clockwise until the stop plate 119 engages stop members 121. When this occurs, the arm 107 continues to rotate in a clockwise direction thereby causing the expandable portion 123 of the plug 111 to expand radially outwardly against the hose and thereby force the hose against the sealing members 61. When this occurs the hose is ready for testing and the internal pressure of the hose is sensed via the channel in rod 113, pressure hose 115 and the pressure transducer (not shown). The pressure transducer is of a conventional design known in the art. After the test has been completed, the rear plug cylinder 39 is actuated to rotate arm 107 counterclockwise to thereby free the plug 111 from the hose and in addition the clamping members are retracted so that the hose can be forced by a succeeding incoming hose into a position between V-belts 44 and 46. These belts transport the hose outwardly toward failure gate 41 shown in FIGS. 1 and 2, where the hose is directed into one of two directions dependent upon whether the hose passed or failed the test. A photodetector 125 is provided so that when the trailing edge of the hose passes the photodetector, rear stop cylinder 15 is actuated to cause stop rod 16 to move upwardly to stop the incoming hose from passing through the test chamber 11 into the output transport mechanism 43.

Refer now to FIG. 7 which is a schematic block diagram of the preferred embodiment of the control circuitry of the leakage analyzer of the present invention. A front sensor logic circuit 81 detects when the trailing edge of a hose being tested has passed the front photodetector 19 and generates in response thereto a cycle start pulse. This pulse is coupled to an exhaust valve logic circuit 82, the output of which causes the exhaust valve 31 to be initially opened when the hose is first positioned in the test chamber 11. In addition the cycle start pulse is coupled to a clamp, inlet air and front stop logic circuit 85 which causes in timed sequence the front and rear clamps to close about the ends of the hose which extend from the test chamber 11, and cooling air to be passed into the air inlet valve 33 and operates the front stop member to appropriately position the hose being tested with respect to the chamber 11. At the same time that a cycle start pulse is coupled to the aforementioned exhaust valve logic and clamp, inlet air and front stop logic circuits, the reset output 86 goes low which signal enables the cooling timer logic circuit 89, the inspection timer logic circuit 90, the exhaust valve logic circuit 82 and the plug valve logic circuit 92. The cooling timer is preset to count a predetermined number of clock pulses generated by an internal clock logic circuit 94. After a predetermined amount of clock pulses have been counted, the cooling timer circuit provides an inspection start signal which is coupled to the exhaust valve logic circuit 82 to cause the exhaust valve to close. At the same time the inspection start signal is coupled to the inspection timer circuit 90 which counts a predetermined number of internal clock pulses at the end of which the inspection timer circuit 91 provides a cycle stop output signal to the cycle stop logic circuit 96. The cycle stop logic circuit 96 provides a cycle reset and stop signal which is coupled to the front sensor logic 81 to reset the sensor logic and at the same time couples the cycle reset and stop signal to the pass/fail logic circuit 100 to inhibit operation of this circuit. The cycle stop logic circuit 96 also provides a cycle stop signal to the exhaust valve logic 82 to cause the valve 31 to open and in addition couples a cycle reset signal to the clamp, inlet air and front stop logic circuit 85 to cause the clamps to be removed from the ends of the test chamber 11.

When the hose being tested is positioned within the test chamber 11 and each of the clamps and plug members are secured in place, the internal pressure of the hose is detected via a pressure transducer of conventional design through the rear plug member 17. The output of the transducer is amplified in the transducer and internal pressure amplifier 102 with the output of the transducer being coupled to the pass/fail logic circuit 100. The pass/fail logic circuit 100 provides a signal to the output gate switch cylinder 40 for rotating the gate 41 to direct the hose being tested in one direction or another depending on whether the hose passed or failed the test. The pass/fail logic circuit also provides a pulse to a hoses boxed and total boxes logic circuit 104 when a pass condition has been indicated. The hoses boxed and total boxes logic circuit 104 includes counters for counting the total number of hoses positioned in each box and the total number of boxes filled. A hose/box switch circuit 106 is manually adjusted to determine how many hoses are to be positioned within each box. This signal is also coupled to the hoses boxed and total boxes of logic circuit 104 such that when a compare situation occurs, an output signal is coupled to the hose stop circuit 108 indicating that a box has been filled and temporarily shutting down the system until a new box is placed in position and the system is again activated. After the hose has been tested and the plugs and clamps removed, a next succeeding hose forces the hose tested out of the rear of the test chamber 11 and into the transport mechanism 43. After the hose has passed the rear photo detector 125, a signal is provided by the rear sensor logic 112 to the rear stop logic circuit 114. This circuit provides a signal for activating the rear stop cylinder 15 to cause rear stop rod 16 to block the passage of the incoming hose so that it does not move past the test chamber 11 and into the output transport mechanism 43. After this has occurred and the front sensor logic has provided a signal indicating that a trailing edge of the hose has moved past the photodetector 19 on its way into the chamber, a cycle start signal is again generated causing the front stop logic circuit 85 to generate a stop reset pulse to the rear stop logic circuit 114. This pulse causes the retraction of the rear stop rod 16 so that the rear clamping and plugging mechanism can be operated in accordance with the timing of the clamp, inlet air and front stop logic circuit 85. The cycle now repeats itself.

Figure 8:
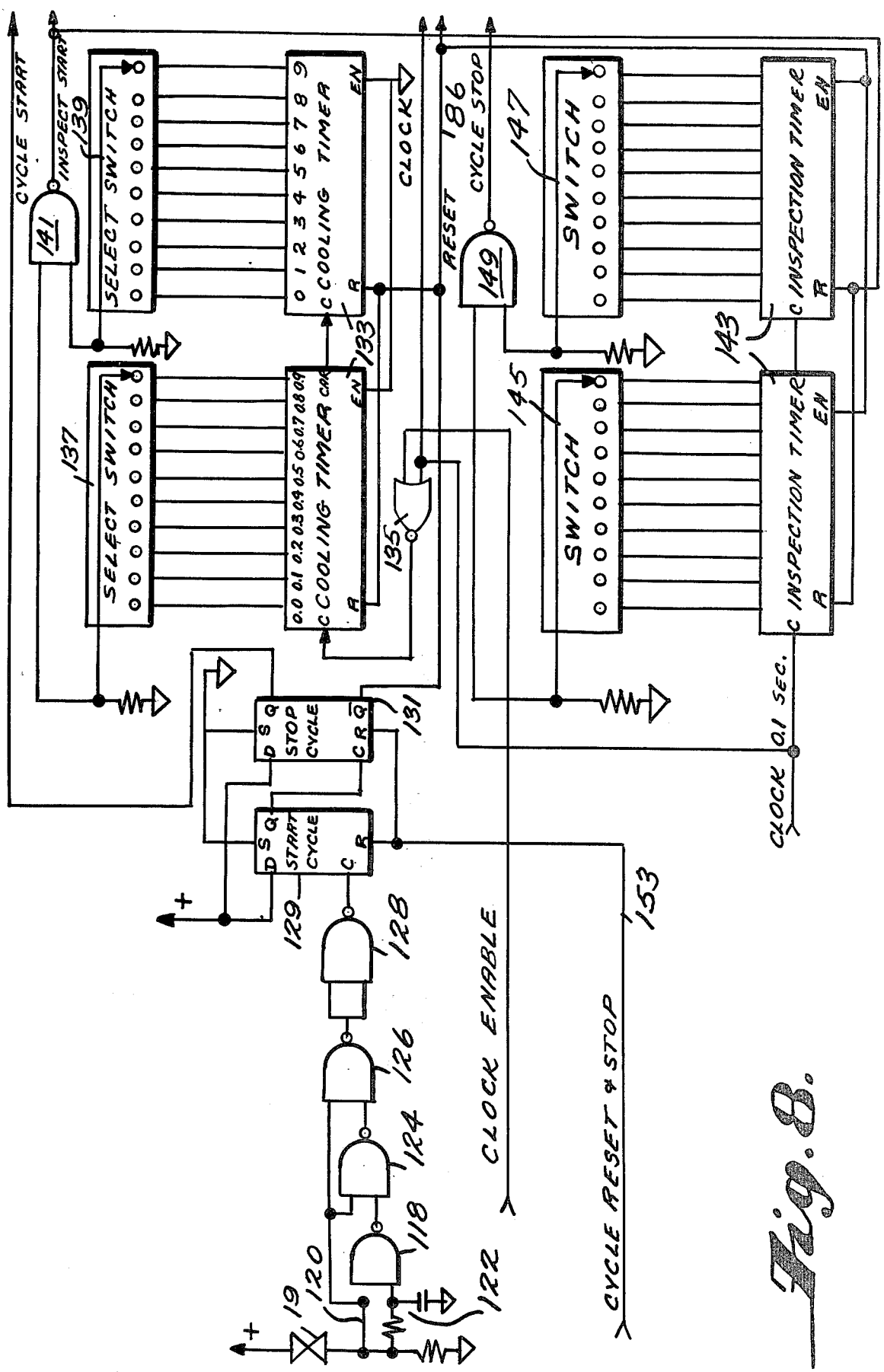
FIG. 8 is a more detailed schematic block diagram of the front sensor logic, cooling timer logic and inspection timer logic of the present invention.

Refer now to FIG. 8 which is a more detailed schematic illustration of the front sensor logic 81, the cooling timer logic 89 and the inspection timer logic 90. A photo cell 19 is provided on the front frame of the leakage analyzer system opposite a light source. The photo cell 19 may be of any conventional type known in the art and conducts when light from the light source impinges upon the photo cell. Thus after the trailing edge of the hose to be tested has passed the photo cell 19, the input to NAND gate 118 on line 120 goes high. However, a delay in the operation of the front stop and front clamps is desirable in order to permit the trailing edge of the hose to move from the photodetector 19 to a position within the entry cone 13. Otherwise if the front sensor cycle start pulse occurred to soon, the front stop 22 would strike the hose causing a jam-up with resulting damage to the hose. Accordingly a delay circuit consisting of RC circuit 122 is provided so that the second input to the NAND gate 118 does not go high until after a predetermined period of time has expired after the trailing edge passes the photodetector 119. In the preferred embodiment this time duration is set at 40 milliseconds. With both inputs to NAND gate 118 high the output thereof is low. The output of NAND gate 124 is accordingly high and the output of NAND gate 126 goes low. This signal is inverted by NAND gate 128 and coupled to the "C" input of dual D flip-flop 129. Flip-flop 129 thus provides a high output at its Q output terminal which signal is coupled to the "C" input of flip-flop 131. At the Q output terminal of flip-flop 131, a cycle start signal is provided which signal is coupled to the pass/fail logic circuit 100, the exhaust valve logic circuit 82, and the front stop logic circuit 85.

At the same time, the $\overline{Q}$ output of flip-flop 131 goes low, which signal clears the reset from the reset terminals of cooling timer decade counters 133. At the same time a clock pulse train from the clock pulse generator 94 having a period of 0.1 seconds is coupled to NOR gate 135. The NOR gate is enabled by a low clock enable signal which is coupled to the other input of the NOR gate 135 when the machine cycle starts. This signal is low when the exhaust valve 31 is opened and goes high as will be seen hereinbelow when the cooling cycle is over and the exhaust valve is closed so that the test chamber 11 can be pressurized. The output of NOR gate 135 is a clock pulse train having a 0.1 second period which train is coupled to the decade counters 133 to initiate counting therein. The outputs of the decade counters 133 are selectively connected to a first switch 137 and a second switch 139. The switch position in switches 137 and 139 determines the duration of the cooling cycle which can last from 0 to 9.9 seconds. In the connection illustrated in FIG. 8, the duration of the cooling cycle is 9.9 seconds. Thus, after the counters 133 have provided high outputs at their 0.9 and 9.0 outlet terminals, high signals are coupled to NAND gate 141, the output of which is a low going inspection start signal.

The inspection start signal is coupled to the exhaust valve logic circuit 82 to cause the exhaust valve 31 to close and in addition is coupled to the plug valve logic circuit 92 to cause the respective front and rear plug valves to be positioned in the trailing and leading ends, respectively of the hose so that the test chamber can be pressurized. Finally, the inspection start signal is coupled to the inspection timing counters 143 to remove the reset thereof. Thus, the inspection timing counters 143 begin to count the clock pulses coupled thereto when the cooling cycle is over. In the preferred embodiment the inspection time can range from 0 to 9.9 seconds and with the switches 145 and 147 as illustrated, high output signals are provided to NAND gate 149 after 9.9 seconds have elapsed. NAND gate 149 thus provides a low going output which is the cycle stop signal, which signal is coupled to the cycle stop logic circuit 96 illustrated in FIG. 7.

Refer now briefly to FIG. 12 which is a schematic diagram of the cycle stop logic circuit 96. The low-going cycle stop signal at the output of NAND gate 149 is coupled to one input of NAND gate 151. The other input to NAND gate 151 from the output of NOR gate 153 is normally high and accordingly, upon the occurrence of a low going cycle stop signal, a high output is generated at the output of NAND gate 151.

Refer now back to FIG. 8 where it can be seen that this high going output of NAND gate 151 is coupled via line 153 to the reset input of flip-flops 129 and 131, thus causing the cycle start signal to go low and the reset signal to go high, thus resetting the system for receiving the next hose to be tested. Referring again briefly to FIG. 12, the machine cycle can be manually reset if desired by depressing a switch 155 to thereby couple a high voltage such as for example, twelve volts to an opto-isolator circuit 157 of convention design known in the art. This high input to the opto-isolator 157 causes the input to NOR gate 154 to go high thereby providing a low going signal at the input to NAND gate 151. This signal is inverted by the NAND gate 151 and coupled to the reset inputs of flip-flops 129 and 131 shown in FIG. 8 to thereby manually reset the system. The reset switch 155 has associated therewith a signal means such as a pair of lamps 159 which are energized when the reset switch 155 is depressed to manually cause the system to be reset.

Figure 9:
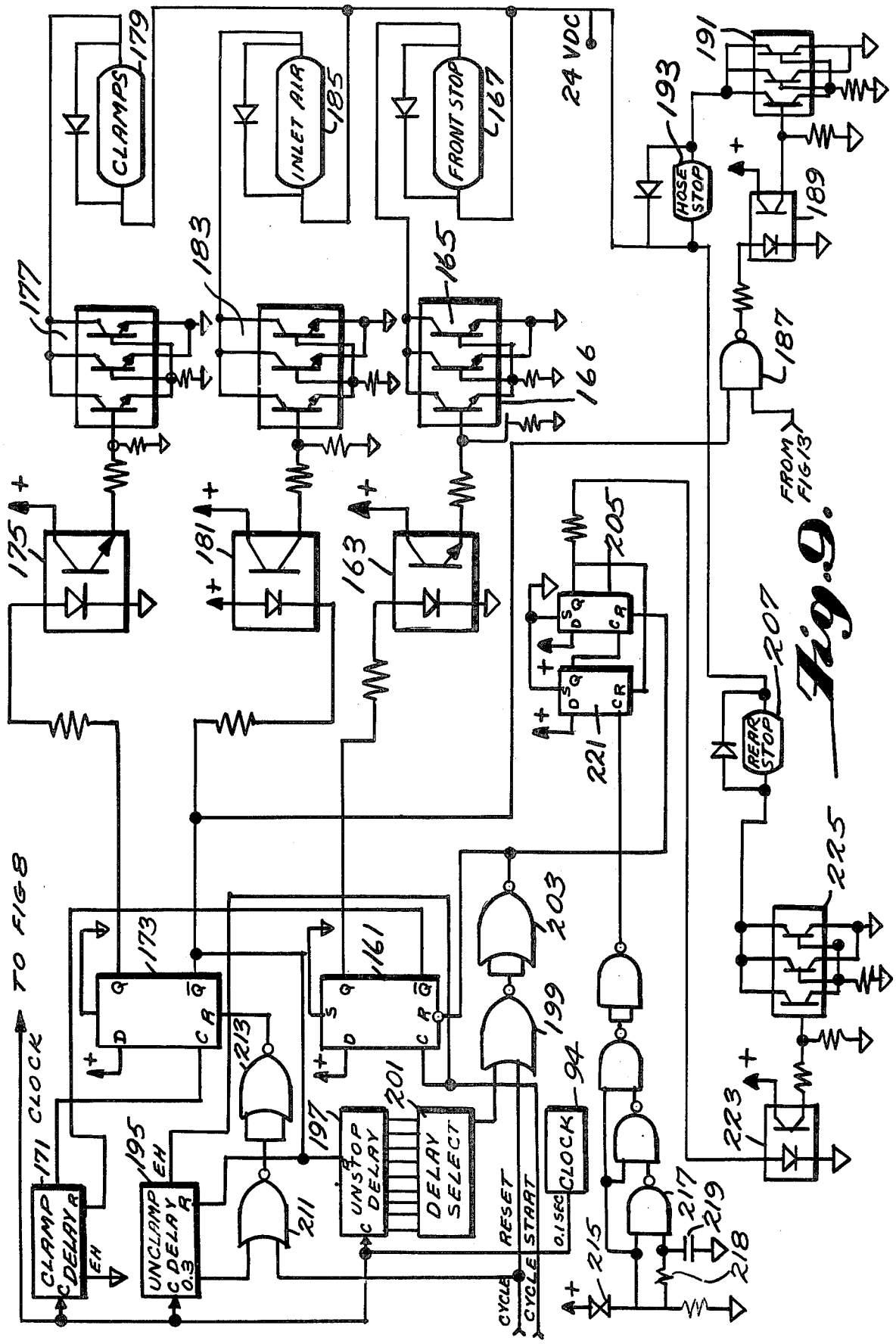
FIG. 9 is a more detailed schematic diagram of the clamping, inlet air, front, rear stop logic, and hose stop logic.

Refer now to FIG. 9 where there is a more detailed disclosure of the clamping, inlet air and front stop logic circuit 85 of FIG. 7. When a cycle start pulse is generated at the output of flip-flop 131 of FIG. 8, this pulse is coupled on line 130 to front stop flip-flop 161. In response thereto, front stop flip-flop 161 provides a high signal at its Q output which is coupled to opto-isolator 163. Opto-isolator 163 provides a high signal to the input of current amplifying transistor 166. Current amplifying transistor 166 accordingly turns on transistors 165 which conduct current from the 24-volt DC source through the front stop valve actuator 167, through the transistors 165 and 166 to ground. The front stop valve is accordingly operative to actuate the cylinder 21 so that the front stop member 22 is moved into position in the front end of the leakage analyzer of the present invention to appropriately position the hose being tested. The diode 169 across the front stop valve actuator 167 is for the purpose of preventing voltage spikes thereacross.

The $\bar{Q}$ output of front stop flip-flop 161 is coupled to the reset input of clamp delay counter 171 to thereby withdraw the reset of the clamp delay counter to permit the counter to count the clock pulses at the output of the clock 94. The clamp delay counter 171 counts to ten to thereby provide a one-second delay after which a pulse is coupled to clamp and air inlet flip-flop 173. Flip-flop 173 in response thereto provides a high output to opto-isolator circuit 175 which in turn turns on current amplifier circuit 177. Accordingly, current flows from the 24-volt DC source through the clamp valve actuator 179 and the transistor current amplifier 177 to ground. The front and rear clamp cylinders are thus actuated to cause the respective clamps to engage one another and the hose at the front and rear of the leakage analyzer of the present invention.

At the $\bar{Q}$ output of flip-flop 173, a low-going pulse is provided which turns on opto-isolator 181. Accordingly, current amplifier 183 is turned on thereby permitting current to flow from the 24-volt DC source through the inlet air valve actuator 185, through the transistor amplifier 183 to ground. Thus, the air inlet valve is opened to let pressurized air flow into the chamber 11. At the same time, the low going output signal of the $\bar{Q}$ output of flip-flop 173 is coupled to NAND gate 187 which inverts the signal and couples it to opto-isolator 189. The output of opto-isolator 189 turns on current amplifier 191 which, in response thereto, permits current to be conducted through the hose stop valve actuator 193 which is positioned in front of the leakage analyzer to prevent a next succeeding hose from passing into the leakage analyzer test chamber. The hose stop member is not illustrated in the drawings but it is of the same design as the rear hose stop member which, it will be recalled, includes a cylinder having a rod extending therefrom which projects into the path of flow of the hoses to prevent the hoses from moving further downstream. As will be seen hereinbelow, when a box of hoses which have passed the leakage analyzer test has been filled, a signal is provided to the other input of NAND gate 187 to thereby prevent further operation of the leakage analyzer until the system has been reset and a new box positioned in place for receiving hoses which have passed the leakage analyzer test.

Finally, the $\bar{Q}$ output of flip-flop 173 is coupled to the reset inputs of the unclamp delay counter 195 and the reset input of the unstop delay counter 197. When the low going signal is coupled to the reset input of the unstop delay counter 197, the unstop delay counter starts to count the clock pulses at the output of clock 94. When a preselected count is received, such as a count of three corresponding to 0.3 seconds, a delay period select switch 201 couples an output pulse to NOR gate 199. It should be understood that while in the preferred embodiment a delay select switch 201 is provided to provide a variable delay, the output of the unstop delay counter 197 could be connected directly to the NOR gate 199. The NOR gate in response thereto provides an output to inverting NOR gate 203. The output of NOR gate 203 is a stop reset signal which causes the front and rear stops to retract. Thus, the output of NOR gate 203 resets flip-flop 161 to thereby deenergize the front stop valve actuator 167 to cause the front stop member 22 to retract away from the front end of the leakage analyzer of the present invention. At the same time the output of NOR gate 203 is coupled to the reset input of flip-flop 205 which in response thereto causes the rear stop member to retract away from the rear of the leakage analyzer of the present invention.

At the end of the test cycle, a cycle reset pulse is coupled to NOR gate 211, the output of which is inverted by NOR gate 213 to thereby reset the clamp and air inlet flip-flop 173. The air inlet valve 185 is accordingly closed. The hose stop valve 193 is retracted to permit a succeeding hose to pass into and against the hose in the test chamber and the clamp valve actuators 179 are deenergized to cause the respective front and rear clamp cylinders to retract the respective clamps away from the hose in test chamber 11.

It should be pointed out that the unclamp delay 195 begins counting when the cycle start signal goes low so that the respective front and rear clamps are not retracted away from one another and from the cylinder 11 and hose 10 until after the front and rear plug members are retracted away from the hose. The reason for this is to prevent the plug members from pulling on the hose as they are retracted away from the front and rear openings of the hose. In the preferred embodiment, the unclamp delay counter 195 is set to a count of 0.3 seconds after which the NOR gate 211 is enabled so that the clamp valve actuator, the air inlet valve actuator 185 and the hose stop valve actuator 193 are not energized until after the front and rear plug members have been retracted away from the hose.

As the hose being tested is pushed out of the test cylinder by the next succeeding hose, the trailing edge thereof passes photodetector 215 which provides, in response thereto, a high going signal to one input of NAND gate 217. A delay circuit, including resistor 218 and capacitor 219, prevents a corresponding high signal being coupled to the other input of the NAND gate 217. This has the effect of insuring that the trailing edge of the hose passes the photodetector before the rear stop member 16 is actuated by the rear stop valve actuator 207 via flip-flops 221 and 205, the opto-isolator 223 and the current amplifier 225. Once both inputs to NAND gate 217 go high, a high signal is provided at the input of flip-flop 221 which in turn causes a high signal at the output terminal Q of flip-flop 205. This signal turns on opto-isolator 223 which causes current to flow from the 24-volt DC source through the rear stop actuator valve 207 and the current amplifier circuit 225 to ground. Thus the rear stop member 16 is forced upwardly into the path of flow of the next succeeding hose to prevent the next succeeding hose from passing on through the test chamber and into the output drive mechanism 43.

Figure 10:
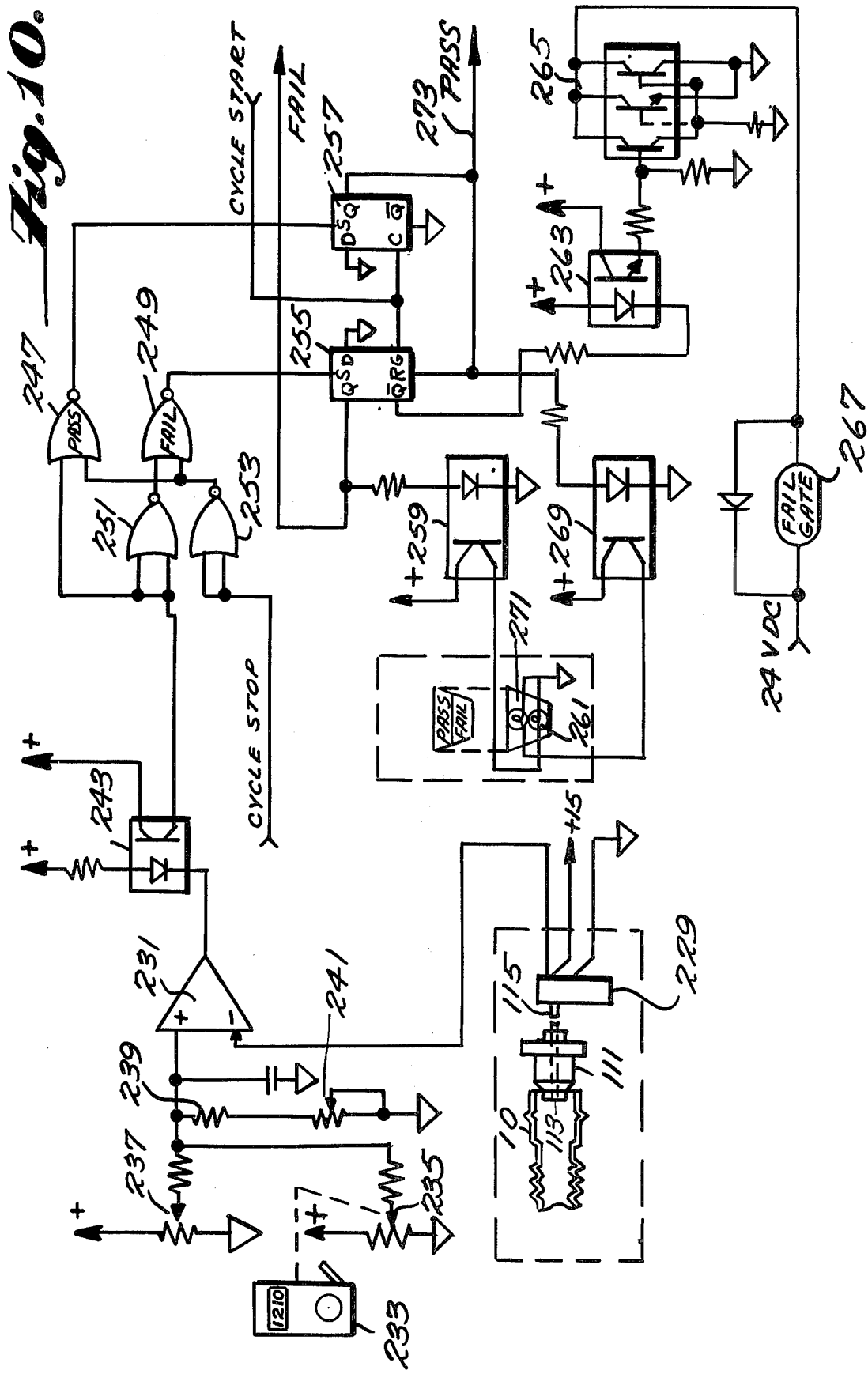
FIG. 10 is a detailed schematic diagram of the pressure transducer and pass/fail logic.

Refer now to FIG. 10 which discloses the pressure transducer and pass/fail logic circuitry. As illustrated the rear plug member 119 is positioned in the lead opening of the hose 10 being tested. The internal pressure of the hose is conveyed through the rear plug member 119 to a pressure transducer 229 via pressure conveying hose 115. The output of the transducer 229 which is of conventional design known in the art is coupled to the inverting input of comparator 231. A preset voltage level is applied to the non-inverting input of the comparator 231 with this voltage representing the cut-off level between a "good" and "bad" hose pressure reading. An internal pressure meter 233 is provided by which a desired internal pressure within the chamber 11 can be appropriately selected. Thus, by appropriately turning the dial, potentiometer 235 is appropriately set to provide a predetermined input level to the comparator 231. Resistor 237 is used to calibrate a zero voltage level when the internal pressure dial of pressure meter 233 is set at 000. Resistors 239 and 241 constitute a balance network for adjusting the linearity of the potentiometer 235 over its full range of adjustment.

The pressure transducer output level is directly proportional to the pressure applied. Thus as the pressure increases within the hose 10, the transducer voltage level output increases. When the voltage level from the transducer 229 exceeds the preset voltage at the non-inverting input to the comparator 231, the output of the comparator 231 will go low. Such a low signal is indicative of a hose that has failed the test, which signal turns on opto-isolator 243 so that the opto-isolator 243 provides a high signal to pass NOR gate 247 and a low signal to fail NOR gate 249 via inverting NOR gate 251. The pass-fail NOR gates 247 and 249 are initially inhibited by means of a output signal from NOR gate 253. The input to NOR gate 253 is a cycle reset and stop signal which is low during the inspection interval, and accordingly the output of the NOR gate 253 is high during the inspection interval. However at the end of the inspection interval, when the detected internal pressure is set, the output of NOR gate 253 goes low thereby enabling NOR gates 247 and 249. If for example the hose has failed, a low signal is coupled to the other input of fail NOR gate 249 thereby causing a high signal to be coupled to the set input of fail flip-flop 255. At the same time, a low signal is provided at the output of pass NOR gate 247 which signal is coupled to the set input of pass flip-flop 257.

Initially both fail and pass flip flops 255 and 257, respectively, are clocked to a low signal, neither pass nor fail condition. This is accomplished by receiving a positive going cycle start signal from the flip-flop 131 of FIG. 8 which signal initially forces the Q output of the flip-flops 255 and 257 low. When however, a fail condition as indicated by a high signal which is coupled to the set input of flip-flop 255, the Q output thereof goes high, thereby providing a signal to opto-isolator 259 to thereby turn the opto-isolator circuit on. This in turn causes the fail lamp 261 to be energized to visually indicate that the hose being tested has failed. At the same time, the Q output of flip-flop 255 is coupled to a second opto-isolator circuit 263 to thereby turn this circuit on. The output of opto-isolator circuit 263 is coupled to current amplifying transistors 265 which cause current from a 24 volt D. C. source to be conducted through the fail gate valve actuator 267 and through the transistors 265 to ground. Thus the gate 41 is rotated to a fail position so that the hose when transported out of the test analyzer by drive means 43 is forced past the gate and into a first fail location. When however, a pass condition is indicated by a high signal to the set input of pass flip-flop 257, flip-flop 257 generates at its Q output, a high signal which is coupled back to reset flip-flop 255 and turns on opto-isolator 269. With opto-isolator 269 turned on pass lamp 271 is energized to indicate that the hose being tested has passed the test. In addition, a positive going output is provided on line 273 and conducted to the hoses boxed logic circuit of FIG. 13. In addition, a high signal is provided to the reset of the failed flip-flop thus disabling it.

Refer now to FIG. 14 where the fail-counter logic is illustrated. The high fail signal at the Q output of fail flip-flop 255 is inverted by inverter 277 and coupled to opto-isolator circuit 279 thus causing a transition in the on-off state of current amplifier 281. When the state of current amplifier 281 goes to the turned-off state, a counter 283 registers one count to thereby give an indication of how many hoses have been rejected.

Figure 13:
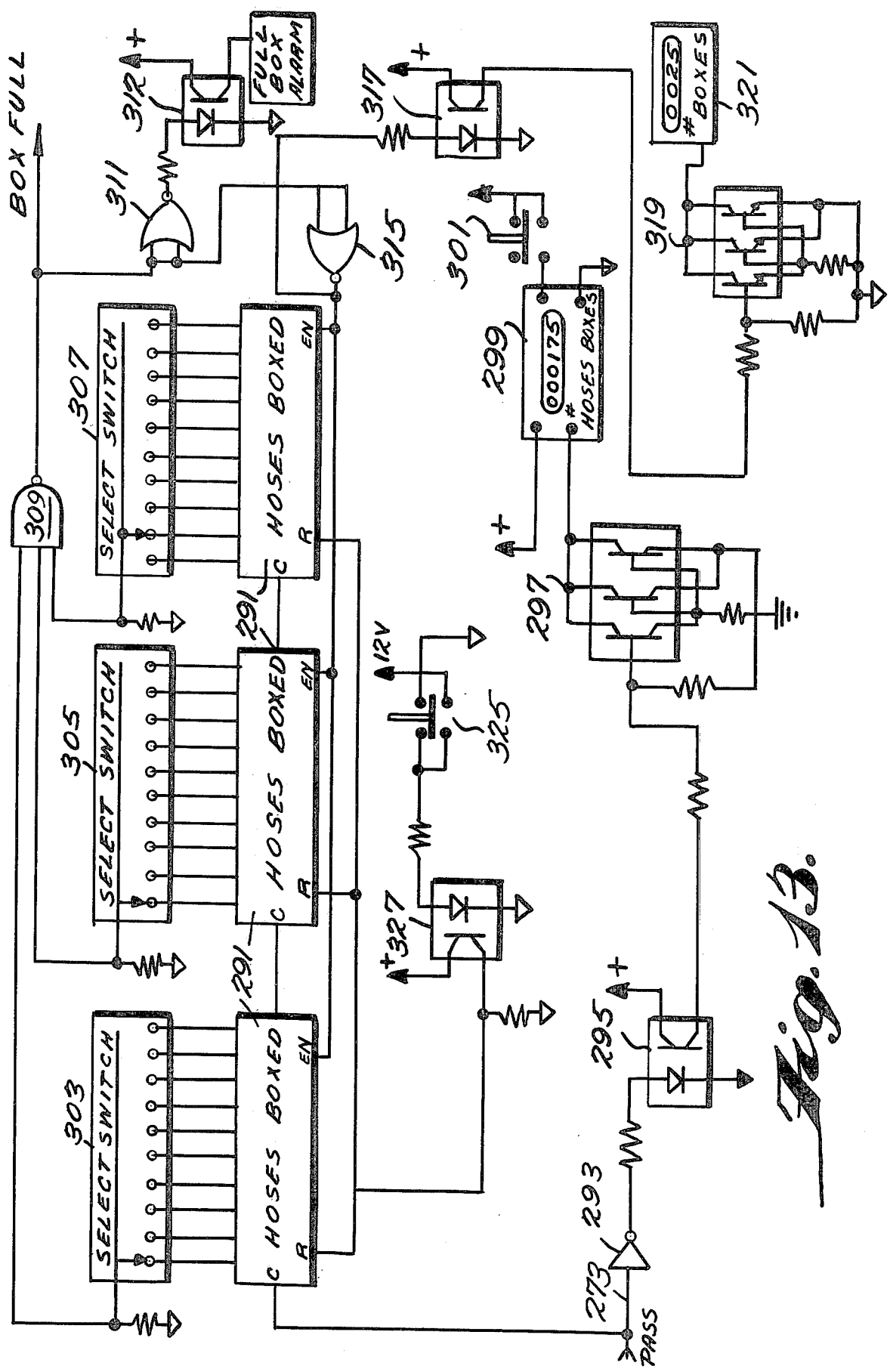
FIG. 13 is a schematic diagram of the hose count logic.

Refer now to FIG. 13 where the hose counting logic is illustrated. When the pass flip-flop 257 of FIG. 10 generates a positive going signal at its Q output on line 273 to thereby indicate that the hose being tested has met required standards, a pulse is coupled to the hoses boxed counter 291 which includes a series of three decade counters appropriately tied together. In addition, this positive going signal is inverted by invertor 293 and coupled to an opto-isolator 295. The opto-isolator in response to the output of the inverter 293 provides an output for changing the state of current amplifying transitors 297 which in turn advance by one count the count of counter 299. The counter 299 registers or advances one count each time there is an indication that a hose has passed the test. Thus, the counter 299 represents the number of hoses which passed the inspection and accordingly the number of hoses boxed. This counter can be appropriately reset by depressing switch 301.

The counter 291 counts the number of hoses which have passed inspection and provides an output to the variable switching units 303, 305 and 307 as the number of hoses which passed the test are counted. The switches 303, 305 and 307 are appropriately set so that when the count reaches a predetermined level the box containing the hoses is filled. As illustrated, the counters are set so that a box is filled after 100 hoses have passed the test and have been deposited in the appropriate box. Thus, three high signals are coupled to NAND gate 309 which in the response thereto provides a low-going box full output signal. This output signal is fed back to NAND gate 187 shown in FIG. 9 to cause the hose stop valve actuator 193 to prevent any further hoses from entering the leakage analyzer when a box has been filled. In addition, this signal is coupled to a NOR gate 311 which provides an output for turning on opto-isolator 312 which in turn energizes a "full box" alarm which may be a sound and/or visual signal. In addition, the box full signal at the output of NAND gate 309 is coupled to a second NOR gate 315 which provides at the output thereof, a high signal for inhibiting the counters 291 from counting further. This high signal is also coupled to another opto-isolator circuit 317, which in response thereto provides a signal for changing the state of current amplifier transistors 319. This change of state of the transistors 319, in turn causes the "number of boxes" counter 321 to advance one count to thereby indicate the total number of boxes filled during a particular run. After a box full indication has been provided, switch 325 is depressed to thereby turn opto-isolator 327 on. This causes a high signal to be coupled to each of the reset terminals of the three decade counters comprising the hoses boxed counter 291 to reset this counter to zero.

Refer now to FIG. 15. A cycle stop signal from the output of NAND gate 149 of FIG. 8 is coupled to inverter 333, the output of which in turn is coupled to opto-isolator 335. The output of opto-isolator 335 changes the state of transitors 337 to thereby advance the count of "number of hoses tested" counter 339, by a count of one. Thus the count indicated by the counter 339 indicates the total number of hoses counted during a predetermined period of time.

Figure 16:
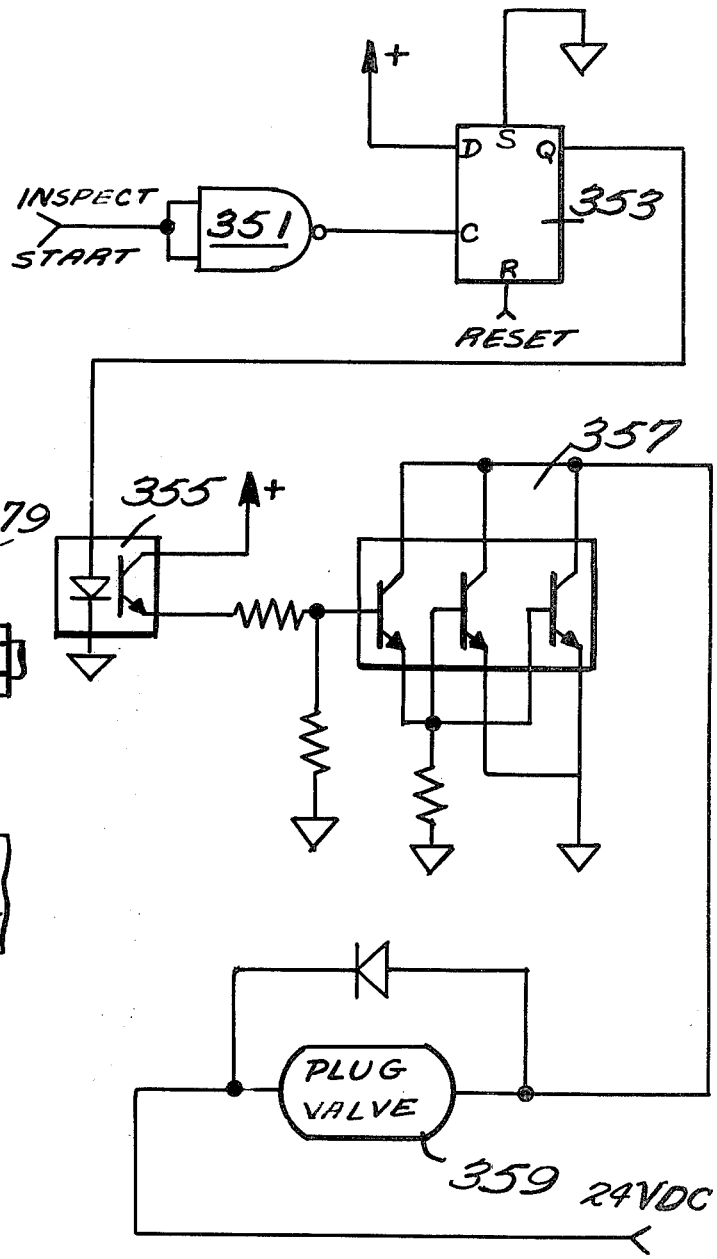
FIG. 16 is a schematic illustration of the plug valve logic.

Refer now to FIG. 16, which is a schematic illustration of the plug valve logic circuitry 92. When the output of the cooling time counter logic circuitry 89 illustrated in FIG. 8 goes low to indicate the beginning of the inspection time, a low signal is coupled to NAND gate 351, the output of which is a high signal. This signal switches flip-flop 353 so that a high signal is provided at its Q output terminal. This high signal turns on opto-isolator circuit 355, to thereby turn on current amplifying transistors 357. Thus current flows from the 24 volt D. C. source through the plug valve actuator 359, the transistors 357 to ground. Thus at the start of the inspection cycle but after the end of the cooling cycle, the front and rear plugs are positioned in the trailing and leading openings, respectively, of the hose being inspected in order to seal off the hose and the chamber 11 from the outside ambient pressure. The plug valves remain in position until a reset signal from flip-flop 131 of the front sensor logic of FIG. 8 is coupled to the reset input of the flip-flop 353. When this occurs the plug valve actuator 359 is de-energized causing the plug at the front and rear of the leakage analyzer of the present invention to be retracted from the hose in which they are positioned.

Refer now to FIG. 11 which is a schematic illustration of the exhaust valve logic circuitry 82. The exhaust valve 31, as aforementioned, is used to vent the cooling air in the test chamber 11 during the cooling cycle, and to vent the external test pressure air at the completion of the inspection cycle. Accordingly, when a cycle start signal is provided at the Q output of flip-flop 131 illustrated in FIG. 8, the exhaust valve flip-flop 361 is switched so that a high signal is coupled to opto-isolator 363. Opto-isolator 363 accordingly, causes current amplifying transistors 365 to turn on to thereby conduct current from the 24 volt D.C. source through the exhaust valve actuator 367, the transistors 365 to ground. The exhaust valve is normally closed, but is opened when the exhaust valve actuator is energized. Thus at the start of the cycle, the exhaust valve is in an open state so that cool air can pass into the test chamber 11 and out through the exhaust valve 31. After the cooling period has terminated, a low-going inspection start signal at the output of NAND gate 141 in FIG. 8 is coupled to NOR gate 369 which in turn provides a high signal to cause the exhaust valve flip-flop 361 to be reset. This in turn causes, the exhaust valve 31 to close. When an inspection start signal is given, the $\overline{Q}$ output of the exhaust valve flip-flop 361 provides a high going clock enable signal which is coupled to NOR gate 135 in FIG. 8 to inhibit the cooling time counter 133 from further counting during the inspection interval. When the inspection cycle is over, the reset signal provided at the $\overline{Q}$ of flip-flop 131, illustrated in FIG. 8, is coupled to the set input of flip-flop 361 to thereby cause the Q output thereof to provide a high signal which in turn causes the exhaust valve 31 to be opened to exhaust the pressurized air within the chamber.

If manual resetting of the leakage analyzer of the present invention is desired, such can be accomplished by depressing the reset switch 155 illustrated in FIG. 12 which in turn provides a positive or high cycle reset signal to the input of NOR gate 369. Thus the output of NOR gate 369 is low preventing the flip-flop 361 from being reset and hence causing the exhaust valve to be opened when the leakage analyzer of the present invention is not in cycle.

Figure 17:
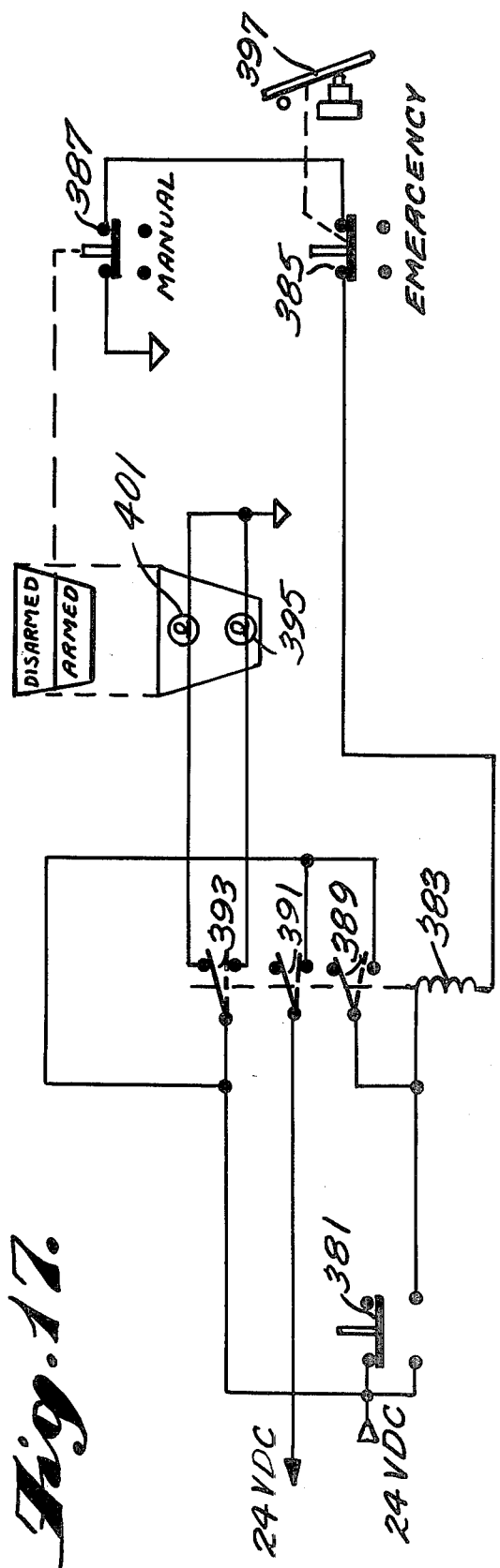
FIG. 17 is a schematic illustration of the emergency stop logic.

Refer now to FIG. 17 which is a schematic illustration of the emergency circuitry for shutting down the leakage analyzer of the present invention. When the system is to be started, button 381 is depressed to cause current to flow through relay coil 383, through emergency stop switch 385 and manual stop switch 387 to ground. This causes the switch arms 389, 391 and 393 to be switched to the positions shown by the dotted lines. Thus current is continuously fed through relay 383 to maintain the switches in the dotted position. At the same time 24 volts is coupled via switch arm 391 to the circuitry of the present invention and 24 volts is coupled to the armed lamp 395 via switch arm 393. When, however, current is interrupted by either depressing manual switch 387 or activating the emergency stop plate 397, current flow through relay coil 383 is interrupted thereby returning the switch arms 389, 391 and 393 to the positions shown in dotted lines. Thus, 24 volts D.C. to the system is interrupted while at the same time, 24 volts is applied to the disarmed lamp 401 to visually indicate that the system has been shut-down. The emergency stop plate 397 is positioned close to the test cylinder 11 as illustrated in FIGS. 1 and 2 in order to insure the health and safety of operators of the leakage analyzer of the present invention.

While a present invention has been disclosed in connection with a preferred embodiment thereof, it should be understood that there may be other variations of the present invention which fall within the spirit and scope of the invention as defined by the appended claims.

What is claimed is:

1. A fault detector for automatically detecting leaks in a train of hoses moving with respect to said detector comprising in combination;

an elongated test chamber having an open front end and an open rear end, means for sensing when the trailing edge of one of said hoses has passed a predetermined point while entering said chamber, means responsive to said sensing means for positioning the trailing edge of said hose with respect to the front end of said chamber, means for clamping the leading and trailing ends of said hoses after a hose has been positioned in said chamber, said clamping means sealing the respective ends of said elongated test chamber, means for sealing the open ends of said hose, said means including a radially expandable plug member, means for positioning one of said plug members in each end of said hose after said hose is clamped, and means for expanding said plug member to force said leading and trailing edges of said hose against said clamping means to thereby seal the inside of said hose with respect to said test chamber, means for applying a predetermined pressure to the inside of said test chamber, means for detecting the pressure inside of said hose a predetermined time after said pressure in said test chamber is increased, means responsive to said detected pressure level for determining whether a leak of unacceptable magnitude exists in said hose, means for releasing said pressure in said test chamber, means for releasing said sealing means from said hose ends, means for unclamping said hose, and means responsive to said pressure determining means for transferring said hose to a location dependent upon whether an unacceptable leak has been detected.

2. A pressure detector for detecting the pressure level within a hollow container comprising:
   means for sealing the open ends of said hollow container, said sealing means including a radially expandable plug member;
   means for positioning said plug member in the open end of said container;
   means independent of the pressure within said container for radially expanding said plug member to force said plug member radially outwardly against the inside periphery of said hollow container;
   pressure conveying means through said plug member for communicating the internal pressure of said hollow container to the outside thereof; and
   pressure transducing means for detecting the pressure level in said hollow container, said pressure transducer being connected to said pressure conveying means.

3. A fault detector for automatically detecting leaks in a train of hoses having openings at each end thereof which continually move with respect to said detector comprising:
   a test chamber,
   means for controlling the passage of said train of hoses into and out of said test chamber in a continual and sequential flow, said means including a front stop means for inhibiting the movement of a succeeding hose into said chamber after a hose has been positioned therein, and rear stop means for stopping the movement of said hose after said hose has passed into said chamber,
   means for positioning said hose in said test chamber,
   means for sealing said openings of said hose,
   means for increasing the pressure in said test chamber about the external periphery of said hose, and
   means for detecting the pressure inside said hose a predetermined time after the pressure in said test chamber is increased, an increase in the detected pressure above a predetermined level indicating that said hose has an unacceptable leak therethrough.

4. A fault detector for automatically detecting leaks in a train of hoses which continually move with respect to said detector, each of said hoses including at least two sections bonded together by a bonding process which substantially increases the temperature about the bonded portion of said hose, and each of said hoses having an opening at each end thereof, comprising:
   a test chamber,
   means for controlling the passage of a plurality of hoses into and out of said test chamber in a continual and sequential flow, said means including a front stop means for inhibiting the movement of a succeeding hose into said chamber after a hose has been positioned therein, and rear stop means for stopping the movement of said hose after said hose has passed into said chamber,
   means for positioning said hose in said test chamber,
   means for cooling said hose after said hose has entered said test chamber, said cooling means including means for directing a cooling gas along the external periphery of said hose,
   means for sealing said openings of said hose,
   means for increasing the pressure in said test chamber about the external periphery of said hose, and
   means for detecting the pressure inside said hose a predetermined time after the pressure in said test chamber is increased, an increase in the detected pressure above a predetermined level indicating that said hose has an unacceptable leak therethrough.

5. The fault detector of claim 4 wherein said means for positioning said hose in said chamber comprises:
   means for clamping the leading and trailing ends of said hose, said clamping means sealing the respective ends of said elongated test chamber.

6. The fault detector of claim 5 wherein said means for sealing said open ends of said hose comprises a radially expandable plug member,
   means for positioning one of said plug members in each end of said hose, and
   means for radially expanding said plug member to force said leading and trailing edges of said hose outwardly against said clamping means to thereby seal the inside of said hose with respect to said test chamber.

7. The fault detector of claim 6 wherein said means for detecting the pressure in the inside of said hose comprises:
   a pressure transducing means, and
   means in one of said plug members for conveying the pressure level in said chamber to said pressure transducing means.

8. In a fault detector, the method of detecting leaks in a hose having openings at opposite ends thereof, said method comprising the steps of:
   positioning said hose in an elongated test chamber;
   clamping the leading and trailing ends of said hose, said clamping step sealing the respective ends of said elongated test chamber;
   sealing the open ends of said hose;
   increasing the pressure of said test chamber about the external periphery of said hose; and
   detecting the pressure inside said hose a predetermined time after the pressure in said test chamber is increased, an increase in the detected pressure above a predetermined level indicating that a fault condition exists in said hose.

9. In a fault detector, the method of detecting leaks in a hose having openings at opposite ends thereof, said method comprising the steps of:
   positioning said hose in an elongated test chamber;
   clamping the leading and trailing ends of said hose, said clamping step sealing the respective ends of said elongated test chamber;
   positioning a radially expandable plug member in each end of said hose;
   expanding said plug member to force said leading and trailing edges of said hose outwardly against said clamps to thereby seal the inside of said hose with respect to said test chamber;
   increasing the pressure in said test chamber about the external periphery of said hose; and
   detecting the pressure inside said hose a predetermined time after the pressure in said test chamber is increased, an increase in the detected pressure above a predetermined level indicating that a fault condition exists in said hose.

10. The method of claim 9 wherein said pressure detecting step comprises the steps of conveying the pressure level in said hose to a pressure transducer, and converting said pressure level to a signal proportional to the detected pressure.

11. In a fault detector, the method of detecting leaks in a hose having openings at opposite ends thereof, said method comprising the steps of:

positioning said hose in an elongated test chamber;

clamping the leading and trailing ends of said hose, said clamping step sealing the respective ends of said elongated test chamber;

positioning a radially expandable plug member in each end of said hose;

expanding said plug member to force said leading and trailing edges of said hose outwardly against said clamps to thereby seal the inside of said hose with respect to said test chamber;

increasing the pressure of said test chamber about the external periphery of said hose;

detecting the pressure inside said hose a predetermined time after the pressure in said test chamber is increased, an increase in the detected pressure above a predetermined level indicating that a fault condition exists in said hose; and controlling the passage of a plurality of hoses into and out of said test chamber in a continual and sequential flow by inhibiting the movement of a succeeding hose into said chamber after a hose has been positioned therein, and stopping the movement of the hose after said hose has passed into said chamber.

12. The method of claim 11 further comprising the step of comparing said pressure proportional signal with respect to a preselected signal to determine whether the rise in pressure in said hose exceeds a preselected level, and generating a fail signal when said pressure proportional signal exceeds said preselected signal.

13. The method of claim 12, further comprising the steps of cooling said hose after said hose has entered said test chamber, wherein said cooling step includes the step of directing a cooling fluid along the external periphery of said hose.

14. The method of claim 11, further comprising the steps of counting the hoses which have unacceptable faults therein and counting the hoses which do not have unacceptable faults therein.

* * * * *